Patented July 24, 1934

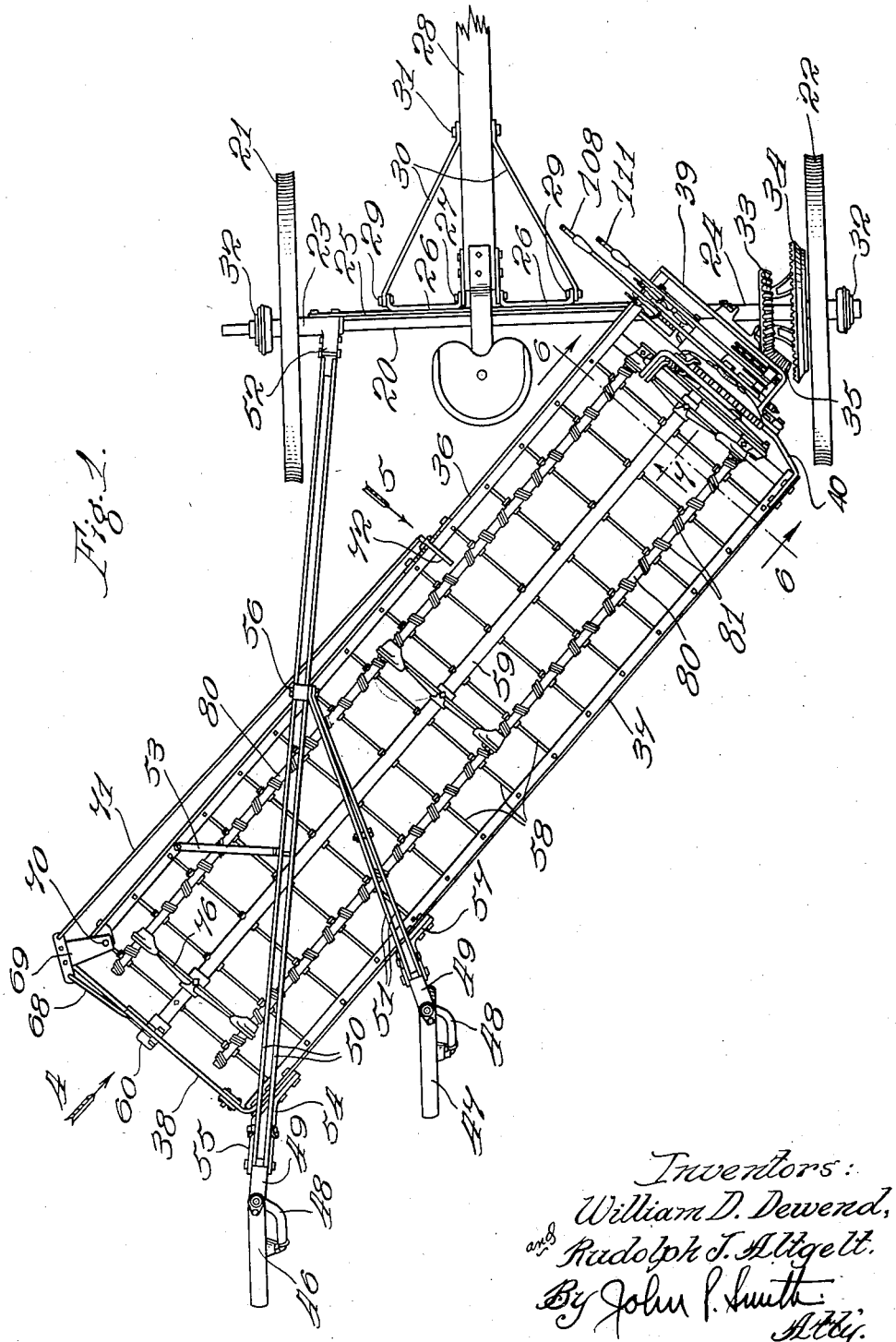

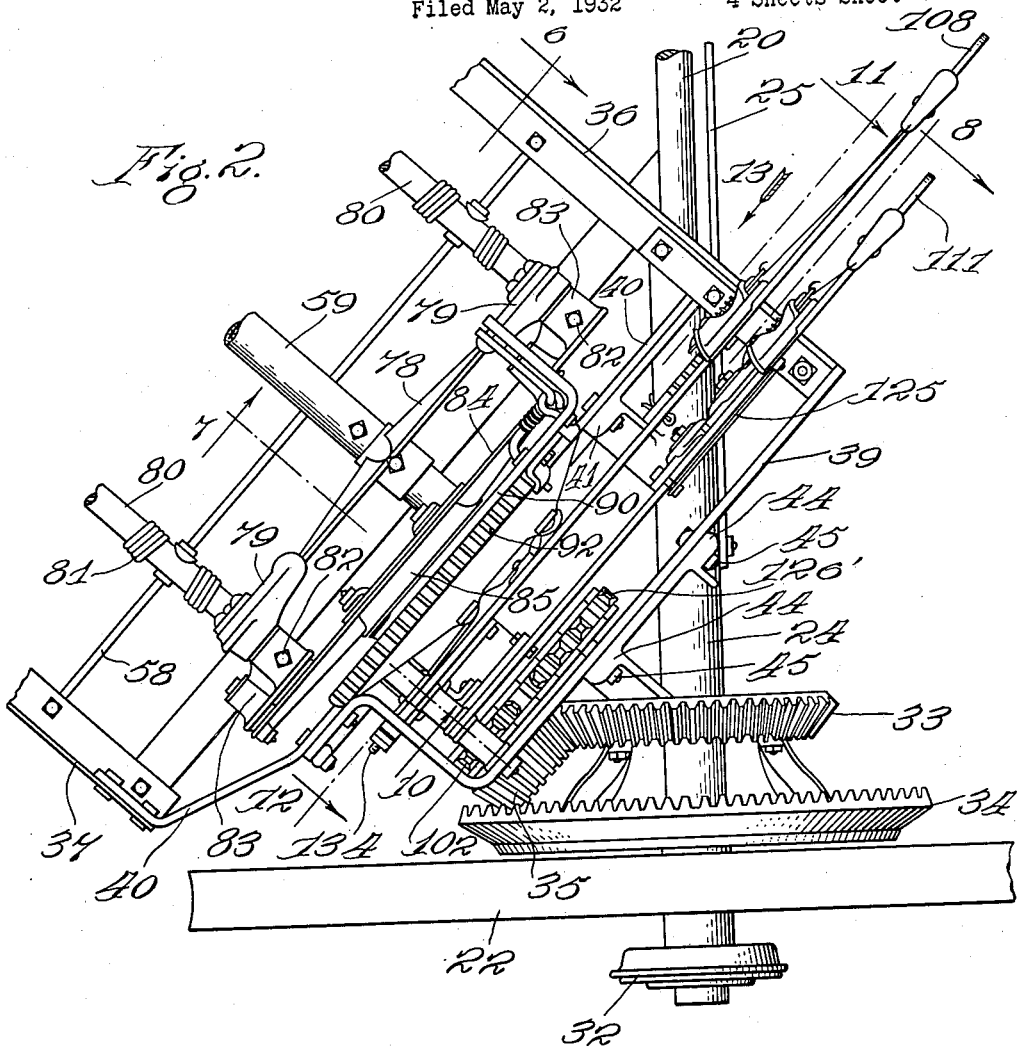

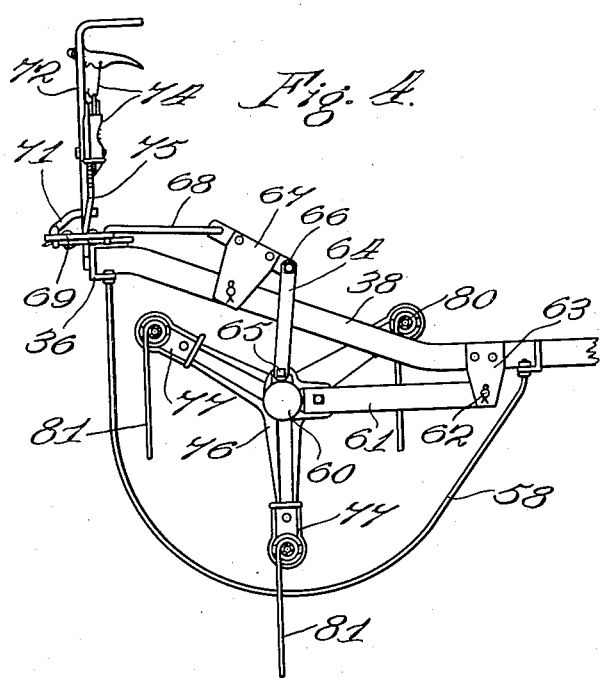
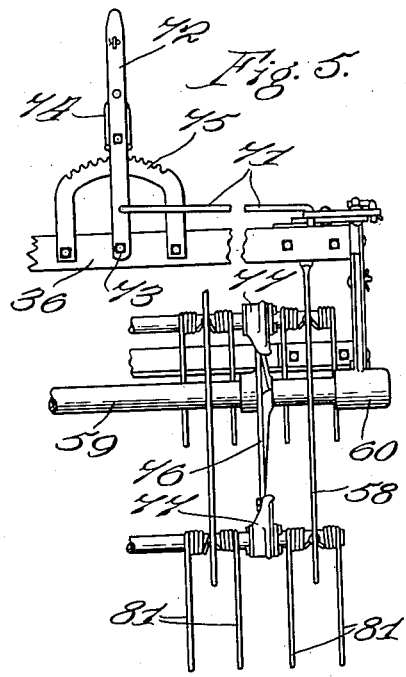
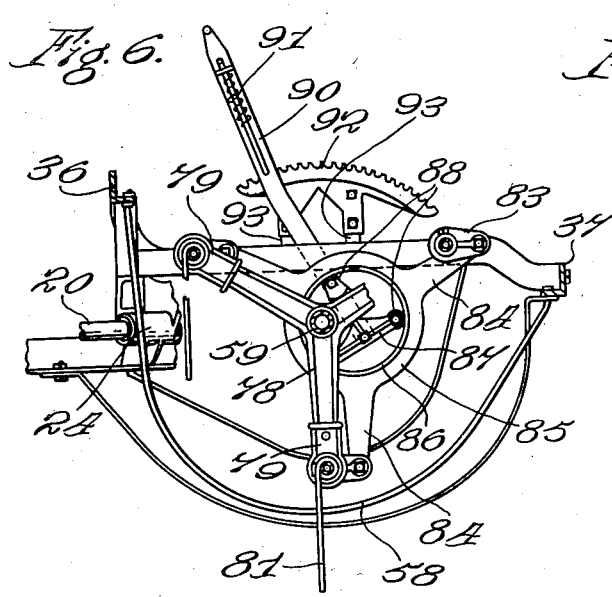
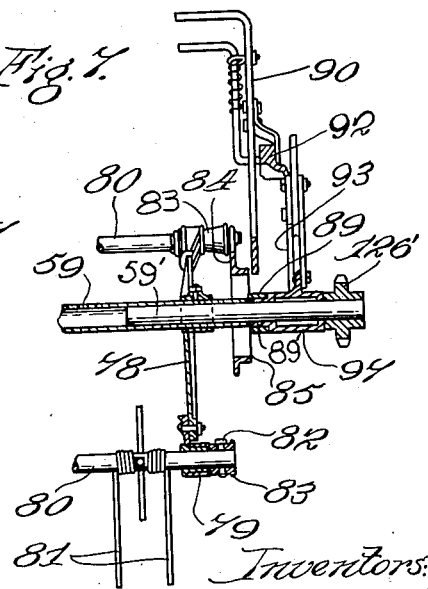

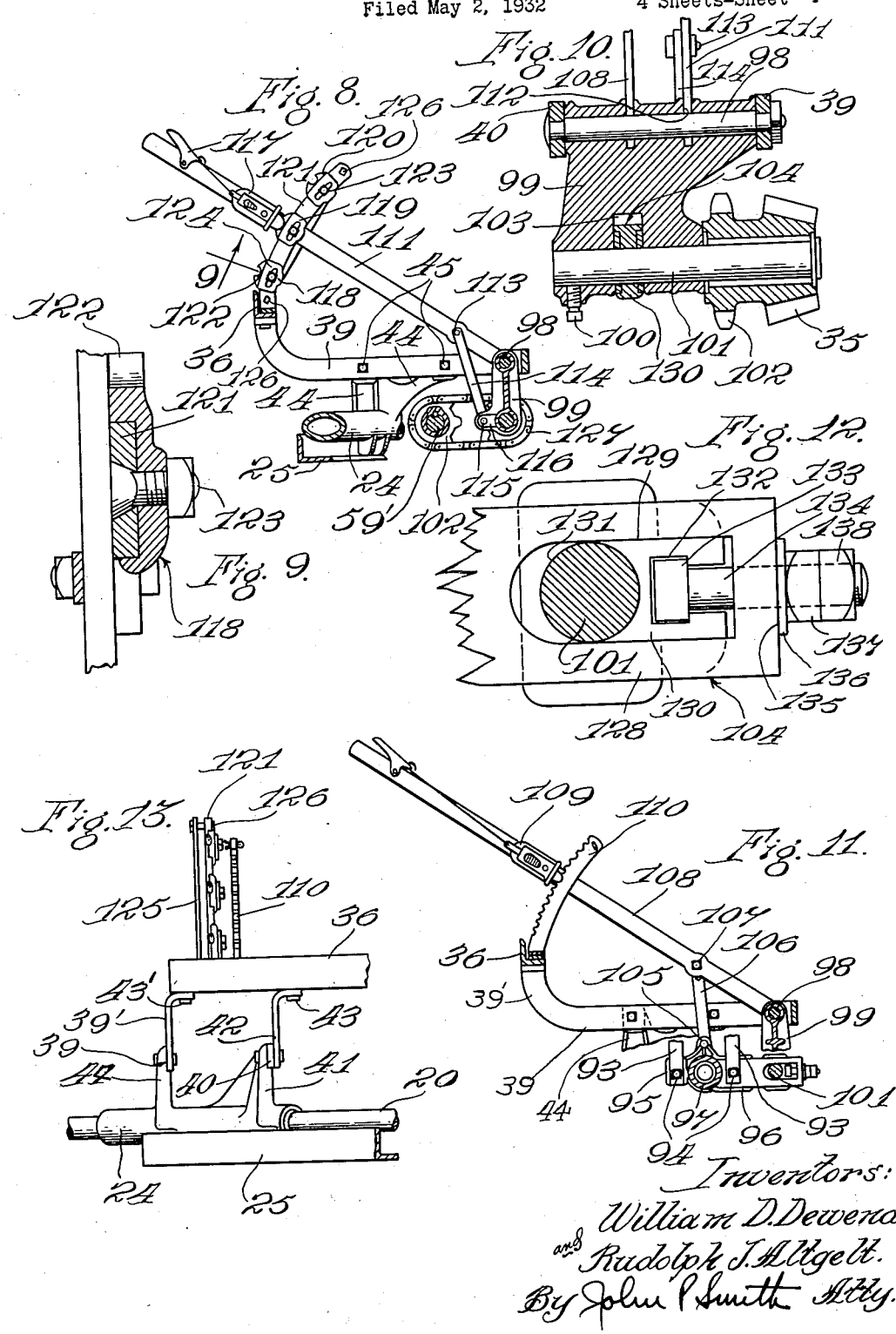

1,967,526

UNITED STATES PATENT OFFICE 1,967,526

SIDE DELIVERY RAKE AND TEDDER

William D. Dewend and Rudolph J. Altgelt, South Bend, Ind., assignors to Oliver Farm Equipment Company, a corporation of Delaware Application May 2, 1932, Serial No. 608,622

16 Claims. (Cl. 56—366)

The present invention is directed to a novel and improved construction of a side delivery rake and tedder, but more particularly to a more efficient, compact and economically constructed combination side delivery rake and tedder.

One of the objects of the present invention is to provide a novel and improved side delivery rake and tedder having a novel and improved form of reel adjustment.

A further object of the invention is to provide a novel and improved side delivery rake and tedder in which provision is made for adjusting the meshing relation of the gears.

A further object of the invention is to provide a novel and improved side delivery rake and tedder in which the reel frame is located forwardly in close proximity with one of the front wheels and drive axle. This arrangement dispenses with the conventional front frame supporting structure and reduces the number of necessary parts by locating the driving mechanism for the reel in a more compact arrangement adjacent to and over the front wheel axle.

A still further object of the invention is to provide a novel and improved side delivery rake and tedder in which the lever and eccentric for controlling the angular position of the teeth, are mounted on and adjusted with the reel.

A further object of the invention is to provide a novel and improved side delivery rake and tedder in which a novel means is provided for adjusting the tension of the drive chain.

A still further object of the invention is to provide a novel side delivery rake and tedder in which the revolving reel is provided with sets of spring fingers or forks between the rear spider and reel supporting frame, so as to prevent the accumulation and winding of material about the reel shaft, as occurs with the conventional form of side delivery rake and tedder.

These and other objects are accomplished by providing a construction and arrangement of the various parts in the manner hereinafter described and more particularly pointed out in the appended claims.

Referring to the drawings,

Fig. 1 is a top plan view of my improved combination side delivery rake and tedder.

Fig. 2 is an enlarged top plan view of a fragmentary portion of the rake and tedder showing particularly, the driving mechanism therefore.

Fig. 3 is an enlarged detailed view of a horizontal cross-section of the driving gear.

Fig. 4 is a rear elevational view taken in the direction indicated by the arrow 4 in Fig. 1 of the drawings.

Fig. 5 is an elevational view of a fragmentary portion of the rake and tedder taken in the direction indicated by the arrow marked 5 in Fig. 1 of the drawings.

Fig. 6 is a cross-sectional view taken on the line 6—6 in Fig. 1 of the drawings.

Fig. 7 is a fragmentary cross-sectional view taken on the line 7—7 in Fig. 1 of the drawings.

Fig. 8 is a detailed cross-sectional view taken on the line 8—8 in Fig. 2 of the drawings.

Fig. 9 is an enlarged cross-sectional view taken on the line 9—9 in Fig. 8 of the drawings.

Fig. 10 is an enlarged cross-sectional view taken on the line 10—10 in Fig. 2 of the drawings.

Fig. 11 is a cross-sectional view taken on the line 11—11 in Fig. 2 of the drawings.

Fig. 12 is an enlarged cross-sectional view taken on the line 12—12 in Fig. 2 of the drawings, and Fig. 13 is a fragmentary elevational view taken in the direction indicated by the arrow 13 in Fig. 2 of the drawings.

The present invention is directed generally to novel and improved features of a combination side delivery rake and tedder in which the reel frame is positioned forwardly to a considerable degree and supported on the transverse axle in close proximity with one of the front drive wheels, and the tongue is connected directly to the axle through the medium of a transverse angle frame member, thereby reducing to a minimum the frame structure of the rake and tedder. This novel side delivery rake and tedder comprises a transverse shaft 20 which is mounted on supporting wheels 21 and 22. Mounted on the shaft 20 adjacent each of the wheels 21 and 22 respectively, are bearings 23 and 24. Extending parallel with the shaft 20 and having its opposite ends secured to each of the bearings 23 and 24 is a transverse angle or frame member 25. Secured to the forward side of the angle member 25 are two spaced apart substantially U shaped brackets 26, to the inner ears of which, as shown at 27, is a pivoted tongue 28. To the outer ears of each of the brackets 26, as shown at 29, converging braces 30 are pivoted and have their forward ends secured to the opposite sides of the tongue 28, as shown at 31. Each of the wheels 21 and 22 are journalled on the shaft 20 and are adapted to drive the shaft 20 by means of ratchet clutches, generally indicated by the reference character 32. These ratchet clutches are of any well known construction and permit either one of the wheels to drive the shaft or permit the shaft to rotate in advance of one of the wheels on a turn to the right or left. Secured to the shaft 20 adjacent the wheel 22 are oppositely disposed bevelled gear members 33 and 34, the teeth of which extend toward one another and are positioned so that the bevelled pinion 35 may be adjusted into meshing relation with either the bevelled gear 33 or 34, for operatively driving the revolving reel in different directions, one of these gears being for the purpose of driving the reel as a side delivery rake, while the other is utilized for operating the rake as a tedder, in a manner well understood in the art. The reel supporting frame comprises two spaced apart diagonally disposed angle members 36 and 37, the rear ends of which are connected by a rear transverse frame member 38, and the forward ends of which are connected by irregular transverse frame members 39 and 40. Formed integrally with and extending upwardly from the bearing 24 are two spaced apart arms 41 to which is secured the forward end of the frame member 40. Secured to the forward arm 41 is an inverted L shaped bracket 42, which in turn has its upper end connected by means of bolts 43 to the under side of the diagonal reel frame member 36 (see Fig. 13). Formed integrally with the bearing 24 and angularly disposed with respect thereto, are upwardly projecting spaced apart arms 44 which are secured by means of bolts 45 to the transverse frame member 39 (see Figs. 2, 8 and 13). The forward end of the transverse frame member 39 is curved upwardly as shown at 39' and has its upper end secured by means of a bolt 43' to the angle member 36.

The rear end of the reel supporting frame is adjustably supported on spaced apart caster wheels 46 and 47, which in turn are provided with axle shanks 48 which have their upper vertical ends adjustably mounted in brackets 49. These brackets 49 are secured between main arch members 50 and supplemental arch members 51. The main arch members 50 extend forwardly and have their forward ends secured to a rearwardly extending arm 52 formed integrally with the bearing 23. The members 50 are further braced to the reel supporting frame member 36 by a supplemental brace bar 53. The rear ends of the main arch member 50 are secured to the reel frame member 37 by means of straps 54 and 55. The supplemental arch members 51 are secured to the center of the arch members 50 by means of a bolt 56, and the rear ends of the supplemental arch members 51 are secured by means of straps 57 to the reel frame member 37. Extending throughout the longitudinal length of the reel supporting frame are a plurality of spaced apart arcuately curved stripper rods 58 which have their rear ends secured to the underside of the frame member 37 and their forward ends secured to the underside of the forward frame member 36 in a manner well understood in the art.

The revolving reel comprises a shaft or pipe 59 which is located substantially in the center of the reel supporting frame and has its rear end journalled in a bearing 60. The bearing 60 is secured to the free end of an arm 61 which in turn is pivoted as shown at 62 to a downwardly extending bracket 63 secured to the transverse reel frame member 38 (see Fig. 4). The rear end of the reel shaft and its bearing 60 is adjustable vertically through the medium of the link 64 which has its lower end connected, as shown at 65, to an ear formed on the bearing 60. The other end of the link 64 is pivotally connected, as shown at 66, to a bell-crank member 67 which in turn is pivotally connected to the transverse frame member 38. The other free end of the bell-crank 67 is connected by means of a link 68 to a second bell-crank 69, which in turn, is pivoted, as shown at 70, to the reel frame. The bell-crank 69 is connected by means of a connecting rod 71 to a manually adjustable lever 72, which in turn, is pivoted as shown at 73 to the forward reel frame member 36. The lever 72 is provided with the usual detent mechanism, generally indicated by the reference character 74, which in turn, is adapted to engage and lock the lever in various positions of adjustment in a quadrant 75. Positioned forwardly and spaced from the bearing 60 at a point adjacent the rear end of the reel shaft 59, is a spider 76. This spider 76 is provided with three equally spaced apart radially projecting arms, to the outer ends of which, are secured bearing brackets 77. Secured adjacent the forward end of the shaft 59 is a second spider 78 which is provided with three similar and equally spaced apart radially projecting arms, to the outer ends of which, bearing brackets 79 are secured. Journalled in each of the bearing brackets 77 and 79 respectively of the rear spider 76 and forward spider 78 are spring fingers or fork supporting shafts 80, which are preferably tubular in form. Secured to each of these shafts at regular spaced apart intervals are spring fingers or forks, generally indicated by the reference character 81. Secured to each of the forward ends of the three shafts 80 by means of bolts 82 are cranks 83. Pivotally connected to the free ends of these three cranks 83, through the medium of radially projecting arms 84, is a third spider, generally indicated by the reference character 85. The spider 85 is provided with a relatively large axial and annular flange as shown at 86, which is normally located eccentrically with respect to the axis of the shaft or pipe 59, as clearly shown in Fig. 6 of the drawings. Telescopically mounted and secured to the forward end of the pipe 59 is a stub shaft 59'. The angular position of the spring fingers 81 is controlled by this eccentrically located spider which may be adjusted for changing the angular position of the teeth or fingers through the medium of a bracket 87, which has journalled thereon three equally spaced apart rollers 88 located within and contacting the flange 86 of the spider 85. This bracket 87 is provided with a laterally extending barrel or bearing portion 89 which is journalled or pivotally mounted on a reduced bearing portion 89' of a bearing barrel 97 hereinafter described. Secured to the bracket 87 is an upwardly extending hand operating lever 90 which is provided with a detent or locking mechanism, generally indicated by the reference character 91, for locking the lever and the eccentric spider in various positions of adjustment through the medium of a quadrant 92, which is secured in position by two downwardly extending straps 93 (see Figs. 7 and 11). The lower ends of these straps 93 are fastened by means of bolts 94 to two oppositely extending ears 95 and 96 formed integrally with the bearing barrel 97, which in turn is journalled on the forward end of the stub shaft 59'. Pivoted between the transverse frame members 39 and 40 by means of a pin or shaft 98 is a swinging hanger, generally indicated by the reference character 99. Secured to the lower end of the hanger, by means of a set screw 100, is a stub shaft 101, on the forward end of which is journalled the bevelled pinion 35, which in turn, has formed integrally therewith, a rearwardly spaced sprocket wheel 102 (see Fig. 10). Adjustably and pivotally mounted on the stub shaft 101, preferably in a recess 103 in the hanger 99, is a chain tightening device, generally indicated by the reference character 104, the details of which will be hereinafter more fully described. One end of this tightener is secured in the socket or ear 96 by means of the bolt 94, as clearly shown in Fig. 11 of the drawings. The bearing barrel 97 is provided with an upwardly extending ear, as shown at 105, and forms the pivotal connection for a link 106, which in turn, has its upper end, as shown at 107, pivotally connected to a lever 108. The lower end of the lever 108 is pivoted to the shaft 98, as shown in Figs. 10 and 11. The lever 108 is provided with the usual hand operating detent mechanism, generally indicated by the reference character 109, for locking the lever in various positions of adjustment in a quadrant 110, which in turn is secured to the frame member 36.

From the above description it will be readily seen that by adjusting the lever 108 in various positions of adjustment that the reel shaft 59 will be vertically adjusted about the stub shaft 101 as a pivot, as clearly shown in Figs. 7 and 11. The bevelled pinion 35 is shifted into meshing relation with the bevelled gears 33 and 34 or into a neutral position in which it does not engage either of the gears, as shown in Fig. 3, by a hand operating lever 111, which is pivoted to the shaft or pin 98 in a recess 112 formed in the hanger 99. Secured to this lever 111, as shown at 113, is a link 114, the lower end of which in turn is connected, as shown at 115, to an ear 116 formed integrally with and projecting laterally from one side of the lower end of the hanger 99. This lever 111 is provided with the usual hand operating detent mechanism, generally indicated by the reference character 117, for locking the lever in one of the three positions, as shown at 118, 119 and 120. The position of the lever as shown in Fig. 8, (the center position) maintains the bevelled pinion 35 out of engagement or inoperative position with respect to the gears 33 and 34, or in other words, maintains the bevelled pinion 35 in neutral position. When the lever is adjusted to lock in a position to engage the lock 120, the bevelled pinion 35 engages the smaller gear 33 for operatively driving the revolving reel as a side delivery rake, but when the lever is adjusted to the lower position so as to engage the lock 118, the pinion is shifted into meshing relation with the large bevelled gear 34, so that the revolving reel is driven at a more rapid speed and in a reverse direction for use as a tedder. In order to maintain proper meshing relation between the bevelled pinion and each of the respective bevelled gears 33 and 34, we have provided a novel type of shiftable lock in which each of the locking members 118, 119 and 120 may be shifted longitudinally of an arcuate bar 121, which has its lower end secured to the frame member 36. Each of these locking members 118, 119 and 120 are provided with notches 122, in which the detent mechanism may be locked, and are secured to the arcuate bar 121 by a bolt 123. The locking members are provided with longitudinal slots so that they may be shifted longitudinally of the arcuate member 121, so as to properly adjust or shift the locking member and insure proper meshing relation of the pinion 35 with each of the gears 33 and 34. The lever 111 is located between the arcuate bar 121 and a guide bar 125 which is held in spaced relation with respect to the arcuate bar 121 by suitable spacers and bolts 126 for supporting the lever 111 in proper position, so that the detent mechanism may engage the locking members carried by the arcuate member as clearly shown in Figs. 8, 9 and 13.

Secured to the forward end of the stub shaft 59' adjacent the bearing 97 is a sprocket wheel 126' which in turn, is geared to the sprocket 102 by a drive chain 127.

Another important feature of the present invention includes a novel chain tightening mechanism, through the medium of which, the drive chain, which operatively drives the revolving reel is maintained taut, and also performs the function of the pivoted link between the drive sprocket and driven sprocket. This mechanism comprises two spaced apart straps 128 secured to the opposite sides of the ear 96 by means of the bolt 94, as clearly shown in Figs. 3 and 11 of the drawings. These straps are provided with longitudinal slots adjacent the rear ends thereof, as shown at 129. Mounted between these straps is an adjustable bearing block, generally indicated by the reference character 130. This bearing block 130 is provided with a bore 131 for the reception of the pin or shaft 101. The rearward end of this block 130 is provided with recesses 132 which conform to the shape and configuration of a head 133 of a bolt 134. Extending over the threaded portion of the bolt 134 and engaging the rearmost edges or ends 135, of the two spaced apart straps 128 is a washer 136. Mounted in threaded engagement with the bolt 134 is a nut 137 and a lock nut 138. From the above description it will be readily seen that by tightening up the nut 137 the bolt 134 will move the bearing block 130 rearwardly with respect to the spaced apart straps 128, thereby moving the reel shaft 59 together with the sprocket 102 in a direction away from the sprocket 126 to take up any looseness in the chain 127.

A summary description of the operation of our improved side delivery rake and tedder is as follows:—In order to adjust the rotating reel together with the spring fingers or forks and the other associated parts, the lever 72 pivoted to the frame member 36 adjacent the operator's seat, may be manipulated, and through the operative connection, including connection rods 71 and 68 and bellcranks 69 and 67, the rear end of the reel shaft 59 may be vertically adjusted about the pivot 62 to which the link 61 is connected, as is clearly shown in Figs. 4 and 5 of the drawings. The front end of the rotary reel is adjusted relative to the ground and the reel supporting frame, by the hand operative lever 108 which is connected through the medium of the link 106, to the bearing 97, for vertically adjusting the forward end of the reel shaft 59 and its associated parts. In this connection, it will be noticed, that the adjusting lever 90 together with the quadrant 92 is adjusted vertically with the rotary reel because the segmental rack 92 is attached to the bearing portion 97, while the lever 90 is attached to the eccentric bracket 87. In order to adjust the angularity of the spring fingers or forks 81, the lever 90 may be adjusted in different positions, which swing the eccentric bracket 87 in various positions with respect to the reel shaft 59.

Another important feature of the present invention is the positioning of a set of spring fingers or forks 81 on each of the three shafts 80 in a position between the rear transverse frame member 38 and the rear spider 76. Experience has shown, that when the rear spider 76 is positioned contiguous with the rear transverse frame member 38, the material becomes entangled and wound around the reel shaft between the rear spider 76 and the transverse bar 38 to such an extent as to render the device inoperative. It is therefore one of the important features of the invention to position the spring fingers or tines between the rear spider and the rear transverse frame member, to overcome this difficulty.

Another important feature of the present invention includes the adjustment of the locks or latches 118, 119 and 120 which are capable of being adjusted longitudinally of the arcuate bar 121 so that the locking position of the lever 111 may be controlled, so as to insure a proper meshing relation of the pinion 39 with the bevelled gears 33 and 34, which may be required to be changed on account of wear, or to secure proper adjustment and meshing relation of these gears in the construction of the side delivery rake and tedder.

While in the above specification we have described one embodiment which our invention may assume in practice, it will, of course, be understood that same is capable of modification, and that modification may be made without departing from the spirit and scope of the invention as expressed in the following claims.

What we claim as our invention and desire to secure by Letters Patent is:

1. A side delivery rake and tedder comprising a reel supporting frame, a rotary reel mounted in said frame, a drive axle, wheels supporting said axle, bearings for said axle adjacent said wheels and connected to said reel supporting frame, a frame member connecting said bearings together and located contiguously to and parallel with said axle, and a tongue pivoted to said last named frame member.

2. A side delivery rake and tedder comprising a wheel supported axle, two spaced apart bearings mounted on said axle, an angle member connecting said bearings together and located contiguously to and parallel with said axle, a reel frame having its forward end supported on one of said bearings located in close proximity to one of said wheels, a rotary reel mounted in said reel frame, an arch bar connected to the other bearing and supporting the rear portion of said reel frame, a caster wheel supporting the rear end of said arch bar, and a pivoted tongue connected to said angle member.

3. A side delivery rake and tedder comprising a reel supporting frame, a rotary reel mounted in said frame, wheel support for the front and rear ends of said reel supporting frame, an eccentrically mounted spider carried by said reel, a hand lever carried by said reel and operatively connected to said eccentric spider, a manually adjustable lever mounted on said reel supporting frame for vertically adjusting the forward end of said reel, wheel support for the rear end of said first named frame, and manually adjustable means operable from the front end of said frame for adjusting the rear end of said frame.

4. A side delivery rake and tedder comprising a reel supporting frame, front and rear wheel supports for said frame, a drive shaft, driving gears carried by said drive shaft, a pivoted hanger carried by said reel supporting frame, a stub shaft mounted in the free end of said hanger, a pinion journalled on said stub shaft adapted to mesh with said gears, a rotary reel mounted in said reel supporting frame and geared to said last named shaft, a manually operable lever pivoted to said reel supporting frame, and a link connecting said lever with said supporting hanger for controlling the meshing relation of said pinion with said gear.

5. A side delivery rake and tedder comprising a reel supporting frame, front and rear wheel supports for said frame, a drive shaft, driving gears carried by said drive shaft, a pivoted hanger carried by said reel supporting frame, a stub shaft mounted in the free end of said hanger, a pinion journalled on said stub shaft and adapted to mesh with said gears, a rotary reel mounted in said reel supporting frame and geared to said last named shaft, a manually operable lever pivoted to said reel supporting frame, a link connecting said lever with said supporting hanger for controlling the meshing relation of said pinion with said gear, a sprocket formed integrally with said pinion, a second sprocket carried by said reel shaft and operatively geared to said first named sprocket, and a chain tightener pivoted to said stub shaft and operatively connected to said reel shaft for adjusting the distance between said stub shaft and said reel shaft.

6. A side delivery rake and tedder comprising a reel supporting frame, front and rear wheel supports for said frame, a drive shaft, driving gears carried by said drive shaft, a pivoted hanger carried by said reel supporting frame, a stub shaft mounted in the free end of said hanger, a pinion journalled on said stub shaft and adapted to mesh with said gears, a rotary reel mounted in said reel supporting frame and geared to said last named shaft, a manually operable lever pivoted to said reel supporting frame, a link connecting said lever with said supporting hanger for controlling the meshing relation of said pinion with said gears, an arcuate bar secured to said reel supporting frame, and adjustable locking members carried by said arcuate bar whereby said lever may be locked in adjusted position for maintaining proper meshing relation between said pinion and said gears.

7. A side delivery rake and tedder comprising a reel supporting frame, front and rear wheel supports for said frame, a drive shaft, driving gears carried by said drive shaft, a pivoted hanger carried by said reel supporting frame, a stub shaft mounted in the free end of said hanger, a pinion journalled on said stub shaft and adapted to mesh with said gears, a rotary reel mounted in said reel supporting frame and geared to said last named shaft, a manually operable lever pivoted to said reel supporting frame, a link connecting said lever with said supporting hanger for controlling the meshing relation of said pinion with said gear, said reel comprising a rotary shaft, spiders secured to said shaft, rotary spring supporting shafts on the outer ends of said spiders, spring fingers secured to said last named shafts, an eccentrically controlled spider for controlling the angularity of said fingers, a sprocket wheel mounted on the forward end of said reel shaft, a second sprocket formed integrally with said pinion, a drive chain operatively connecting said sprockets together, a chain tightener pivoted to said reel shaft and pivoted to said stub shaft comprising two spaced apart plates having two slotted apertures through which said stub shaft extends, and an adjustable bolt for controlling the distance between said reel shaft and said stub shaft for adjusting the tension of said drive chain.

8. A combined side delivery rake and tedder comprising a reel supporting frame, axle and wheel supporting structure for the front end of said frame, supporting caster wheels for the rear end of said frame, a rotary reel mounted in said reel supporting frame including a reel shaft, an adjustable bearing support for the rear end of said shaft, an adjustable support for the front end of said reel shaft including a hanger pivoted to said reel frame, a stub shaft mounted in the free end of said hanger, a chain tightening mechanism pivoted to said stub shaft and connected to the bearing support for the front end of said reel shaft, gears secured to said axle, a pinion carried by said stub shaft adapted to be driven by said gear, and a manually operable lever operatively connected to said hanger for controlling the meshing relation of said pinion with said gears.

9. A side delivery rake and tedder comprising a reel supporting frame, a drive axle and wheel support for the front end of said frame, caster wheel for the rear end of said frame, a rotary reel mounted in said reel supporting frame including a reel shaft, a stub shaft geared to said drive axle and operatively connected to said reel shaft, spiders secured to the forward and rearward ends of said reel shaft, spaced apart fork shafts journalled in the outer ends of said spiders, spaced apart fingers secured to each of said finger shafts, an eccentric spider pivotally mounted on said reel shaft having crank connections with each of said finger shafts, an eccentric bracket pivoted to said reel shaft and operatively connected to said eccentric spider, a locking sector mounted on said reel shaft, an operative hand lever secured to said eccentric bracket and adapted to be locked in various positions of adjustment in said sector for controlling the angularity of said fingers, and a hand lever connected to said reel shaft for vertically adjusting the same on a radius about said stub shaft as a center.

10. A side delivery rake and tedder comprising a reel supporting frame, a drive axle and wheel support for the front end of said frame, a caster wheel for the rear end of said frame, a rotary reel mounted in said reel supporting frame including a reel shaft, a stub shaft geared to said axle and operatively connected to said reel shaft, spiders secured to the forward and rearward ends of said reel shaft, spaced apart finger shafts journalled in the outer ends of said spiders, spaced apart fingers secured to each of said finger shafts, an eccentric spider pivotally mounted on said reel shaft having crank connections with each of said finger shafts, an eccentric bracket pivoted to said reel shaft and operatively connected to said eccentric spider, a locking sector mounted on said reel shaft, an operative hand lever secured to said eccentric bracket and adapted to be locked in various positions of adjustment in said sector for controlling the angularity of said fingers, a hand operative lever pivoted to said reel supporting frame and operatively connected to the forward bearing support for said reel shaft for vertically adjusting the forward end of said rotary reel on a radius about said stub shaft as a center, and a manually operable lever for vertically adjusting the bearing support for the rear end of said reel.

11. A side delivery rake and tedder comprising a reel supporting frame, axle and wheel support for the forward end of said frame, caster wheels for supporting the rear end of said frame, a rotary reel mounted in said reel supporting frame, including a reel shaft, spiders secured to said reel shaft adjacent the forward and rearward ends thereof, finger shafts journalled to the outer ends of each of said spiders, and spaced apart spring fingers secured to said finger shafts, certain of said fingers being positioned between the rear spider and the rear portion of said reel supporting frame for preventing the clogging of material between said spider and said reel supporting frame.

12. A side delivery rake and tedder comprising a reel supporting frame, axle and wheel support for the forward end of said frame, caster wheels for supporting the rear end of said frame, a rotary reel mounted in said reel supporting frame, including a reel shaft, spiders secured to said reel shaft adjacent the forward and rearward ends thereof, finger shafts journalled to the outer ends of each of said spiders, and spaced apart spring fingers secured to said finger shafts, a set of said fingers being positioned between the rear spider and the rear portion of said reel supporting frame for preventing the clogging of material between said spider and said reel supporting frame.

13. A side delivery rake and tedder comprising a reel supporting frame, a rotary reel mounted in said frame, a drive axle, a stub shaft mounted on said frame and adapted to be driven by said axle, wheels supporting said axle, bearings for said axle adjacent said wheels and connected to said reel supporting frame, means for driving said reel from said stub shaft, and a hand lever mounted on said frame for laterally adjusting said stub shaft without effecting the operative relationship between said stub shaft and said reel shaft.

14. In a side delivery rake and tedder comprising a reel supporting frame, a drive shaft and wheel support for said frame, driving gears carried by said drive shaft, a movable stub shaft carried by said frame, a pinion journaled on said stub shaft and adapted to mesh with said gears, a rotary reel mounted on said frame and geared to said stub shaft, a manually operable lever pivoted to said reel frame, and a link connecting said lever with said stub shaft for controlling the meshing relation wtih said pinion with either of said gears.

15. In a side delivery rake and tedder comprising a reel supporting frame, a drive shaft and wheel supports for said frame, driving gears carried by said drive shaft, a pivoted hanger carried by said reel supporting frame, a stub shaft mounted in the free end of said hanger, a pinion journalled on said stub shaft adapted to mesh with said gears, a rotary reel mounted in said frame and geared to said last named shaft, a manually operable lever pivoted to said reel frame, and a link connecting said lever with said hanger for controlling the meshing relation of said pinion with either of said gears.

16. In a side delivery rake and tedder comprising a reel supporting frame, a drive shaft and wheel supports for said frame, driving gears carried by said drive shaft, a pivoted hanger carried by said reel supporting frame, a stub shaft mounted in the free end of said hanger, a pinion journalled on said stub shaft adapted to mesh with said gears, a rotary reel mounted in said frame and geared to said last named shaft, a manually operable lever pivoted to said reel frame, a link connecting said lever with said hanger for controlling the meshing relation of said pinion with either of said gears, and means for adjusting said reel vertically in said frame.

WILLIAM D. DEWEND.
RUDOLPH J. ALTGELT.